June 15, 1937.　　　J. W. BARTON　　　2,083,770
STEAM TRAP
Filed Nov. 24, 1936
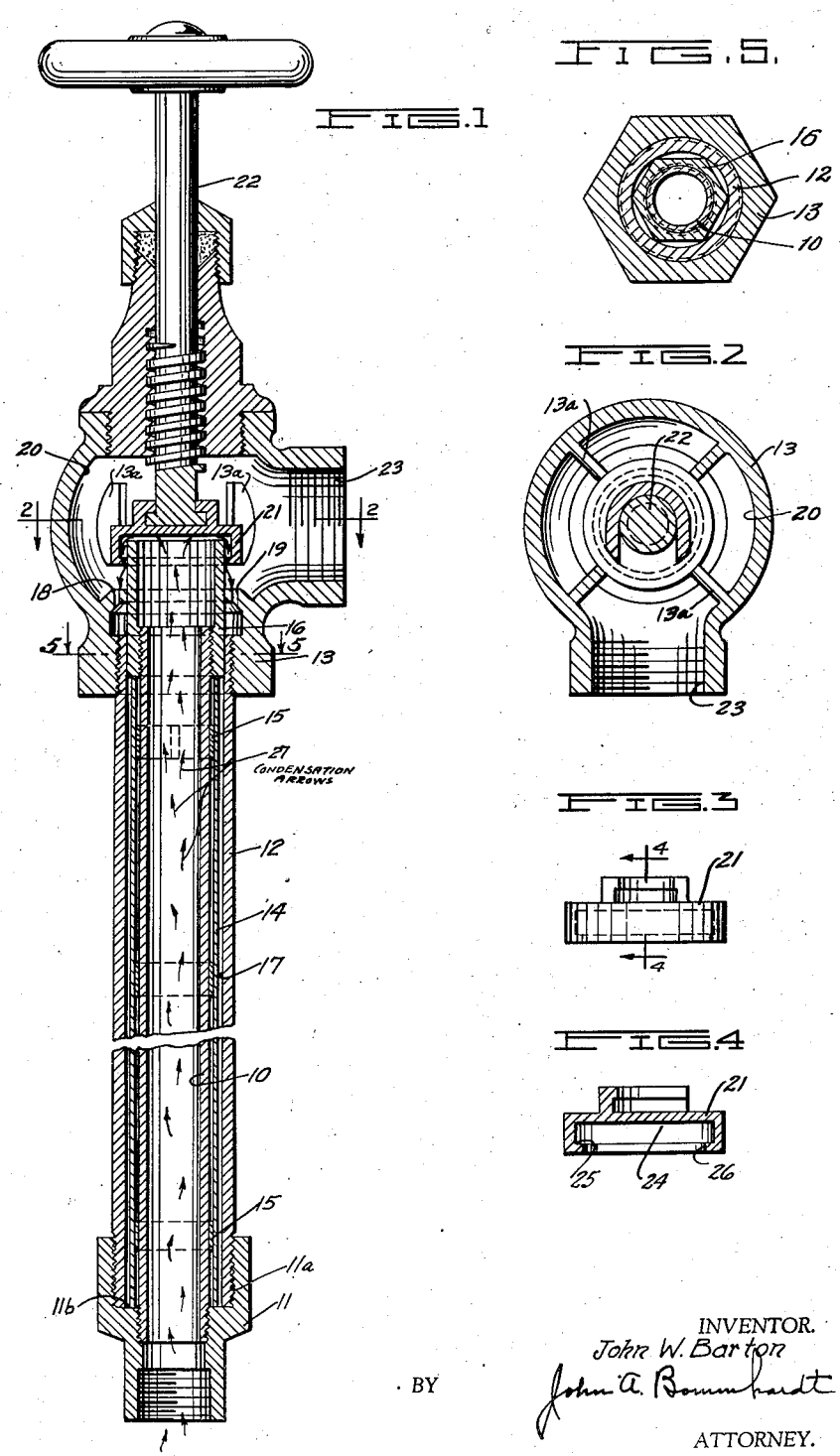
INVENTOR.
John W. Barton
BY
ATTORNEY.

Patented June 15, 1937

2,083,770

UNITED STATES PATENT OFFICE 2,083,770

STEAM TRAP

John W. Barton, Cleveland, Ohio

Application November 24, 1936, Serial No. 112,536

1 Claim. (Cl. 236—60)

This invention relates to steam traps of the type having an expansion tube, and in particular for use in high pressure service.

This application is an improvement over my former Patents 941,846 and 941,847 issued November 30, 1909.

The principal object of this invention is to provide an integral flanged valve disc of such shape and size as will adequately function for high pressure service, absorbing the wear that now causes deterioration of the valve body in high pressure service as when the pressure exceeds 125 pounds.

Another object is to provide a means whereby the velocity of the condensation is decreased, this being obtained by the condensation striking flanges forming the side walls of the valve disc and escaping through the opening in said disc.

These and other objects and advantages may be seen from the following specifications and its accompanying illustrations, in which;

Fig. 1 is a longitudinal section of the trap.

Fig. 2 is a section on line 2—2 of Fig. 1.

Fig. 3 is a front elevation of the valve disc.

Fig. 4 is a section on line 4—4 of Fig. 3.

Fig. 5 is a section on the line 5—5 of Fig. 1.

Referring to the illustrations:—an expansion tube 10 is screwed firmly at one end into the inlet fitting 11 which is connected to any suitable steam supply, and extends within the outer tube 12 which is screwed into the bell 11a of the fitting 11.

The opposite end of the outer tube 12 is screwed into the casing or body 13 of the main valve, and extending around the expansion tube 10 within the said outer tube 12 is a tubular casing 14 which is spaced from the outer tube 12 by incomplete rings 15; this tubular casing 14 is superimposed over the expansion tube 10 and is held in place by the rings 15 and by a ground joint at one end against the shoulder 11b of the fitting 11. The coefficient of expansion of the tube 12 is less than that of the tube 10 and casing 14.

The opposed end of the tubular casing 14 is held in place by the valve seat 16 which is screwed over the end of the expansion tube 10 and in against the end of the said casing 14.

The tubular casing 14 is made of a metal having a greater coefficient of expansion than that of the tube 10, so that its total expansion will be at least equal to that of the expansion tube 10 and it maintains at all times a dead air space around the expansion tube; the annular space between the tubular casing 14 and the outer tube 12 forms a vacuum chamber 17 in which a vacuum can be easily maintained.

The valve seat 16 projects into the valve casing or body 13 through a guide formed by a shoulder 18 on the inside of the casing; this shoulder having a plurality of ports 19 which provide a passage between the vacuum chamber 17 and the main chamber 20 of the valve body 13. The tubular seat 16 is hexagonal on the outside, as shown in said patents, to afford connection between the chambers 17 and 20.

The valve seat 16 projects beyond the shoulder 18 and into the chamber 20 of the valve body 13.

A valve disc 21 is connected to a screw stem 22 by which the valve is opened, closed or adjusted, said disc being held in position by the ribs 13a in the valve casing 13.

The inlet to the trap is through the fitting 11 with the outlet at 23, which will be connected either directly or indirectly through a radiator, to a vacuum pump or a waste outlet.

The valve disc 21 is recessed at 24 and inwardly flanged at 25, the valve seat 16 projecting through the opening 26 in the flanged portion 25 of the disc 21 and within the recess 24, adjustment being made to insure the correct amount of clearance between the top of the valve seat 16 and the inner surface of the recess 24.

In operation, the action is similar to that described in my former patents, that is, either in consequence of the steam pressure at the inlet, or a vacuum drawn in the outlet, the condensation flows through the tube 10 and out over the edge of the valve seat 16, until the tube 10 expands sufficiently to close the seat 16 against the valve 21, and closes the trap except that with a pressure of say 125 pounds or more, the condensation, shown by arrows 27, upon leaving the valve seat 16 strikes the surface of the recess 24 in the disc 21 and is directed downward where it strikes again on the flange 25 and is deflected through the opening 26, between the valve seat 16 and the flange 25 thus decreasing the velocity of the condensation and preventing wear on the valve body; the disc and valve seat which are easily replaceable, thus absorb all wear, leaving the valve body intact.

I claim:

In a steam trap, the combination with an expansion tube having a tubular valve seat at its end, of an integral valve comprising a disc extending across the seat, a rim depending outside of and around the end of the seat, and an annular flange projecting inwardly from the rim, toward the side wall of the tubular seat, both said rim and flange being out of contact with said valve seat in all operative positions.

JOHN W. BARTON.